May 23, 1939. F. B. HIRSCH 2,159,949
STARCH APPLYING MACHINE
Filed March 10, 1938 2 Sheets-Sheet 1

INVENTOR
Fred B. Hirsch
BY Nathaniel Frucht
ATTORNEY

May 23, 1939.  F. B. HIRSCH  2,159,949
STARCH APPLYING MACHINE
Filed March 10, 1938  2 Sheets-Sheet 2
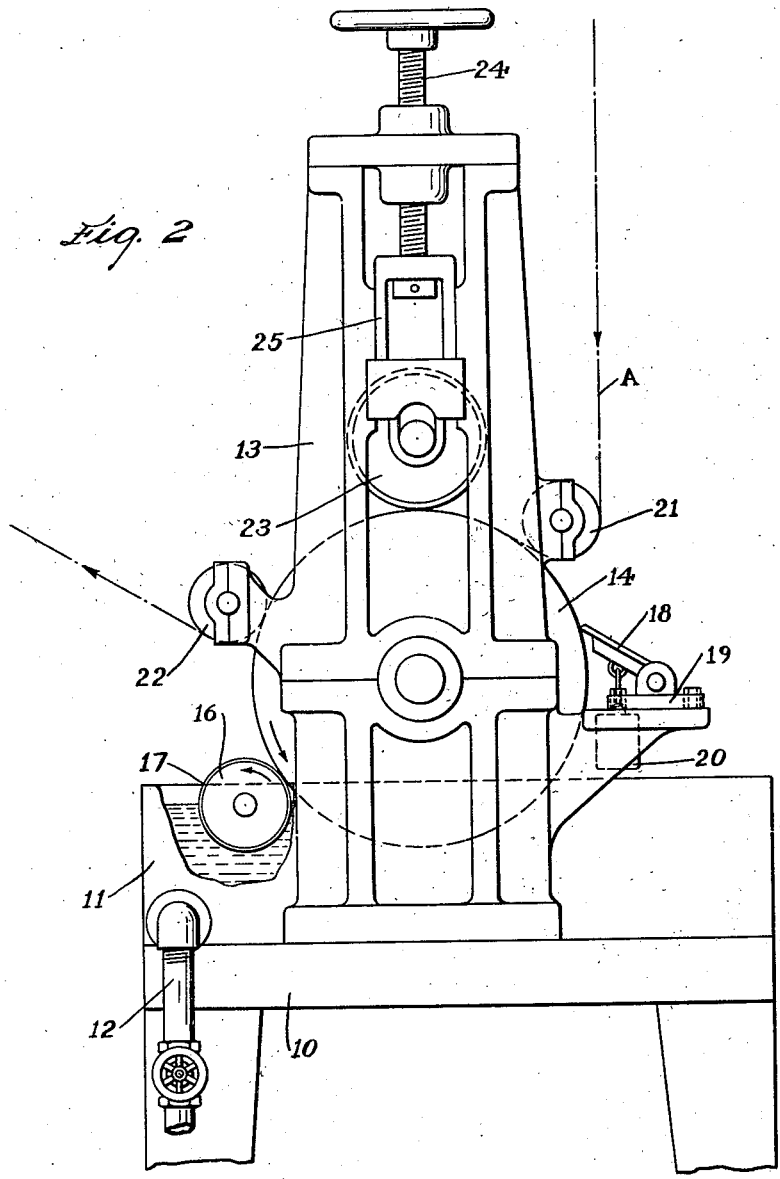
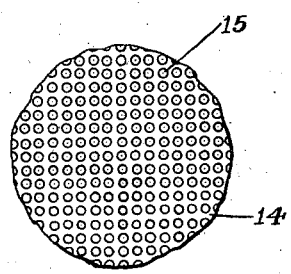
INVENTOR
Fred B. Hirsch
BY Nathaniel Frucht
ATTORNEY Patented May 23, 1939

2,159,949

UNITED STATES PATENT OFFICE 2,159,949

STARCH APPLYING MACHINE

Fred B. Hirsch, East Providence, R. I., assignor to Dodgeville Finishing Company, Inc., Attleboro, Mass., a corporation of Massachusetts Application March 10, 1938, Serial No. 195,055

4 Claims. (Cl. 91—51)

My present invention relates to textile machinery, and has particular reference to a novel method and a novel apparatus for applying starch to textile materials.

It is the principal object of my invention to provide a simple and practical arrangement for starching one side of textile material, and to regulate the application of the starch so as to obtain the proper amount required for different materials.

It is a further object of my invention to provide a pressure regulated application of starch to one side of a textile material, so as to ensure proper retention of the starch.

An additional object of my invention is to provide an arrangement for starching one side of textile material having a raised pattern, so as not to flatten the raised pattern, and to preserve it in its raised relation to the background.

Another object of my invention is to control the amount of starch supplied to the material and to return excess starch back to the starch reservoir.

With the above and other objects and advantageous features in view, my invention consists of a novel method for supplying starch to textile materials and a novel apparatus therefor more fully described in the detailed description following, in conjunction with the accompanying drawings, and more specifically defined in the claims appended thereto.

In the drawings:

Fig. 2 is a side elevation thereof, parts being broken away; and

Fig. 3 is an enlarged fragmentary detail showing the surface of the starch applying drum.

Figure 1:
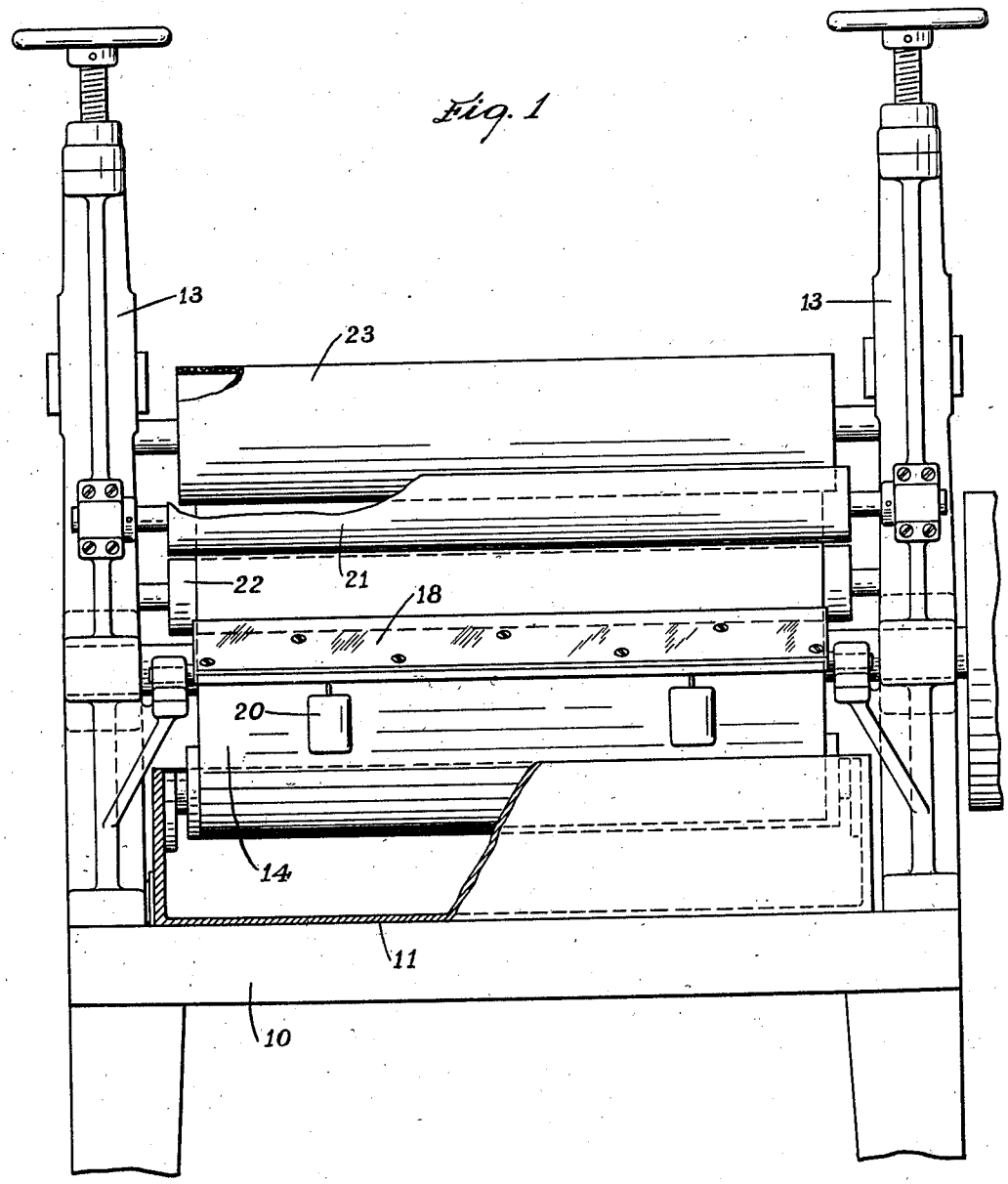
Fig. 1 represents a front elevation of the novel apparatus, parts being broken away to more clearly disclose the structure.

It has been found desirable to apply starch in predetermined quantities to one side of a textile material, and particularly to one side of textile materials which have raised patterns. I have found that cloth of this type may be starched on the under surface thereof, without flattening, spreading, or otherwise distorting the raised pattern. To this end, I provide a tank containing a controlled supply of starch and position a drum in said tank to be power rotated, the surface being formed and arranged so as to positively retain a layer of starch as it alternately dips into and emerges from the starch supply in the tank. This is accomplished by providing the drum with a series of shallow surface indentations, which may be of any desired shape or size, and positioning a secondary starch applying roller in rotating contact with the drum, the secondary roller having a starch retaining cover such as cloth or the like and periodically dipping into the starch and then contacting the surface of the drum so as to positively force starch into the drum indentations. I have provided means for passing a cloth, such as is received from a fluffing machine in the case of raised patterns, so as to engage the starched surface of the drum on its way to the tentering machine; a pressure roller is preferably used to press the cloth against the drum surface, the pressure being regulable to compensate for the raised pattern thereon. I have further provided a regulable means for removing excess starch from the drum prior to its contact with the undersurface of the cloth to be starched, the parts being so arranged and positioned that the drum picks up a coating of starch of predetermined thickness, and then contacts the underside of the cloth with a predetermined pressure so as to thoroughly starch the underside thereof.

Referring to the drawings, the novel apparatus includes a frame 10, in which is mounted a starch supply tank 11 to which starch may be conducted in any suitable manner, a valved drain conduit 12 being provided for emptying. Two spaced standards 13 are positioned on the frame 10, and rotatably support a drum 14 which dips into the tank 11 at its lower portion, the drum 14 being provided with a series of spaced shallow indentations 15 which may be of any size or shape and which preferably consist of small closely spaced circular depressions. As the drum 14 is rotated by suitable means, the starch will be received in the depressions 15; to ensure proper filling of these depressions an auxiliary roller 16 is rotatably mounted at one side of the drum, so as to also dip into the starch, this roller being provided with a cloth cover 17 for taking up starch, the relative mounting of the auxiliary roller to the drum being designed to press the cloth cover 17 into close contacting engagement with the surface of the drum so as to ensure filling of the depressions; the auxiliary roller is arranged on the descending side of the drum for this purpose. As the drum, after contacting the auxiliary roller 16, enters further into the starch, it accumulates a surface layer of starch in addition to the starch which has filled the depressions; a doctor blade 18 is positioned on the outgoing side of the drum and is swingingly mounted on a support 19, which is adjustable towards and away from the drum, so as to scrape the surface of the drum and thus control the thickness of the starch coating thereon. The pressure of the doctor blade on the drum surface is regulated by means of weights 20, attached to the underside of the doctor blade, the weights being of the proper size to effect the desired control of the thickness of the starch layer. Two guide rolls 21, 22 are rotatably mounted on the standards 13 and are so positioned with respect to the drum that a cloth sheet, designated A in the drawings, passes under the lower roll 21, then contacts the drum surface through a predetermined arc, and then passes under the roll 22 to the tentering machine. The positions of the rolls 21 and 22 are set so as to obtain the desired amount of contact of the underside of the cloth with the drum surface, and to obtain a reasonable amount of pressure of the cloth on the drum surface; the roller 21 can be made adjustable if desired, to obtain a further regulation. The proper positioning and setting of the rolls 21 and 22 have been found sufficient to provide a suitable coating of starch on the underside of the cloth, without spreading, flattening or otherwise distorting any raised design on the upper surface of the cloth; an additional pressure roller 23 is also provided, which, as shown in Fig. 2, is vertically adjustably mounted in the standards 13, by means of hand operated screws 24 and cooperating shaft cages 25. This roller is preferably covered with a resilient material, such as rubber, and its weight yieldingly presses the cloth with predetermined pressure against the surface of the drum 14. The two guide rolls 21 and 22 are preferably steel rolls, but may be covered with cloth or with rubber or similar material, if desired.

The operation of the improved starching apparatus is now clear. A supply of starch having been placed in the tank 11, the drum 14 rotates so as to dip into this tank, and the auxiliary roller 16 presses its starch filled cloth cover against the surface indentations, the drum then accumulating an additional surface coating of starch, the thickness of which is regulated by the adjustable doctor blade 18. The cloth is from the fluffing machine or the processing apparatus, and is guided so as to contact the starched surface of the drum over a predetermined arc, and to engage the surface of the drum with a suitable predetermined pressure; additional pressure is obtained by means of the adjustable pressure roller 23, which presses the cloth against the surface of the drum, a yielding lining being provided on the pressure roller so as not to affect or to disturb any raised surface figures. Since the apparatus may be set to accommodate any type of cloth, and is preferably positioned so as to starch the under surface of the cloth on its way to the tentering machine, the cost of applying starch to the cloth is greatly reduced.

While I have described a specific constructional embodiment of an apparatus for carrying out my invention, it is obvious that changes in the arrangement of the parts, in the adaptation of the parts to obtain a desired amount of starching, and in the application of the machine to other textile coating uses, may be made in accordance with the requirements for different textile finishing operations, without departing from the spirit and the scope of the invention as defined in the appended claims.

I claim:

1. In an apparatus for applying starch to textile materials, a frame, a tank, said tank having a treating liquid therein, a drum rotatably mounted in said frame for dipping into said liquid, said drum having spaced depressions extending over substantially the entire surface thereof, a roller mounted in said tank and having a liquid retaining surface and contacting said drum surface, and means for pressing textile material against the surface of said drum above said liquid.

2. In an apparatus for applying starch to textile materials, a frame, a tank, said tank having a treating liquid therein, a drum rotatably mounted in said frame for dipping into said liquid, said drum having spaced depressions extending over substantially the entire surface thereof, a roller mounted in said tank and having a liquid retaining surface and contacting said drum surface and means for pressing textile material against the surface of said drum above said liquid comprising guide rolls and a pressure roller having a yielding surface and adjustable to regulate the contacting pressure of said textile material.

3. In an apparatus for applying starch to textile materials, a frame, a tank, said tank having a treating liquid therein, a drum rotatably mounted in said frame for dipping into said liquid, said drum having spaced depressions extending over substantially the entire surface thereof, a roller mounted in said tank and having a liquid retaining surface and contacting said drum surface, a doctor blade for scraping the drum surface, and means for pressing textile material against the surface of said drum above said liquid.

4. In an apparatus for applying starch to textile materials, a frame, a tank, said tank having a treating liquid therein, a drum rotatably mounted in said frame for dipping into said liquid, said drum having spaced depressions extending over substantially the entire surface thereof, a roller mounted in said tank and having a liquid retaining surface and contacting said drum surface, an adjustable doctor blade for scraping the drum surface, and means for pressing textile material against the surface of said drum above said liquid.

FRED B. HIRSCH.